Figure 1:
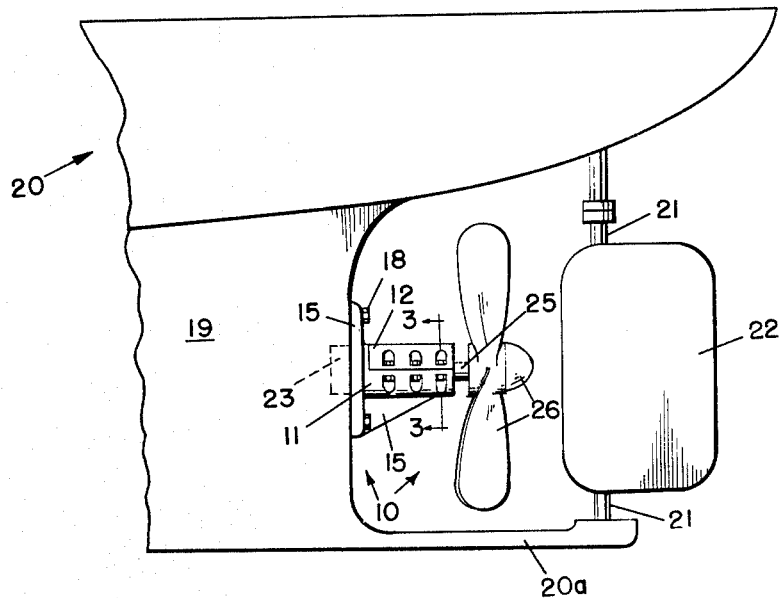

Feb. 22, 1966 J. G. SATTERTHWAITE 3,236,570
DEMOUNTABLE STERN HOUSING FOR MARINE BEARINGS
AND METHOD OF USING THE SAME
Filed Dec. 26, 1962 3 Sheets-Sheet 1

INVENTOR.
JAMES GLENN SATTERTHWAITE
BY
Felix A. Russell

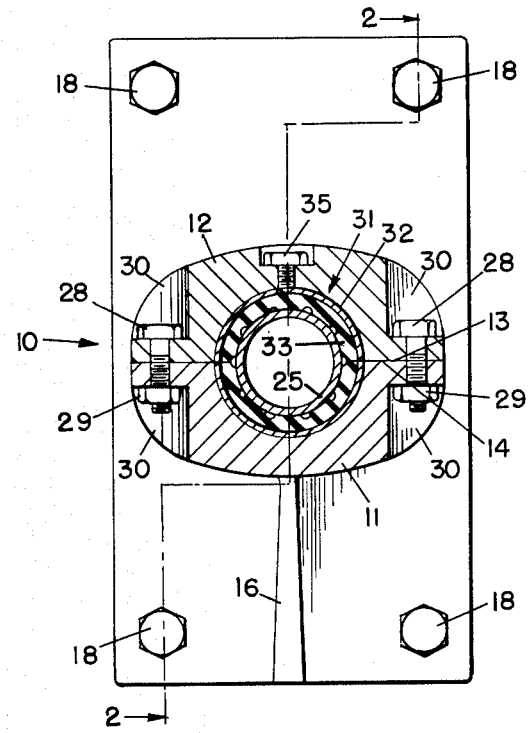
Fig. 3
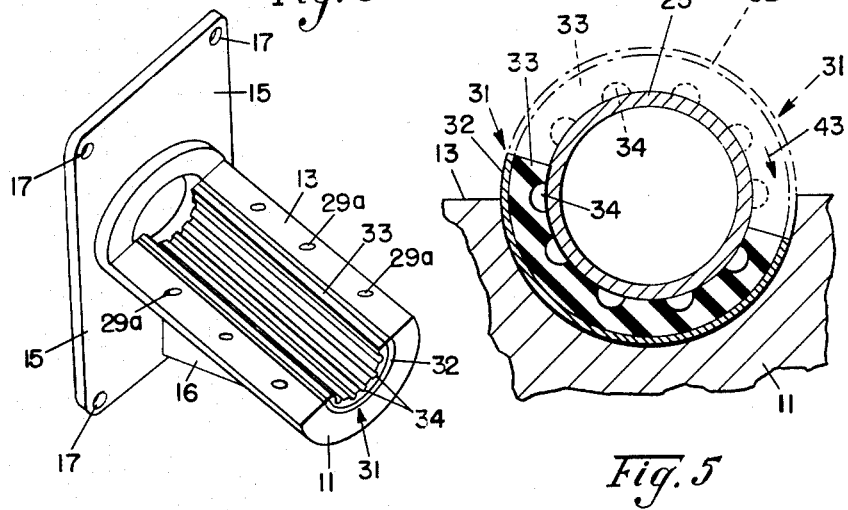
Fig. 4
Fig. 5
INVENTOR.
JAMES GLENN SATTERTHWAITE

Feb. 22, 1966    J. G. SATTERTHWAITE    3,236,570
DEMOUNTABLE STERN HOUSING FOR MARINE BEARINGS
AND METHOD OF USING THE SAME
Filed Dec. 26, 1962    3 Sheets-Sheet 3
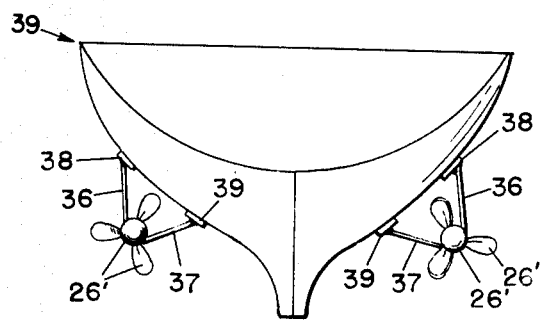
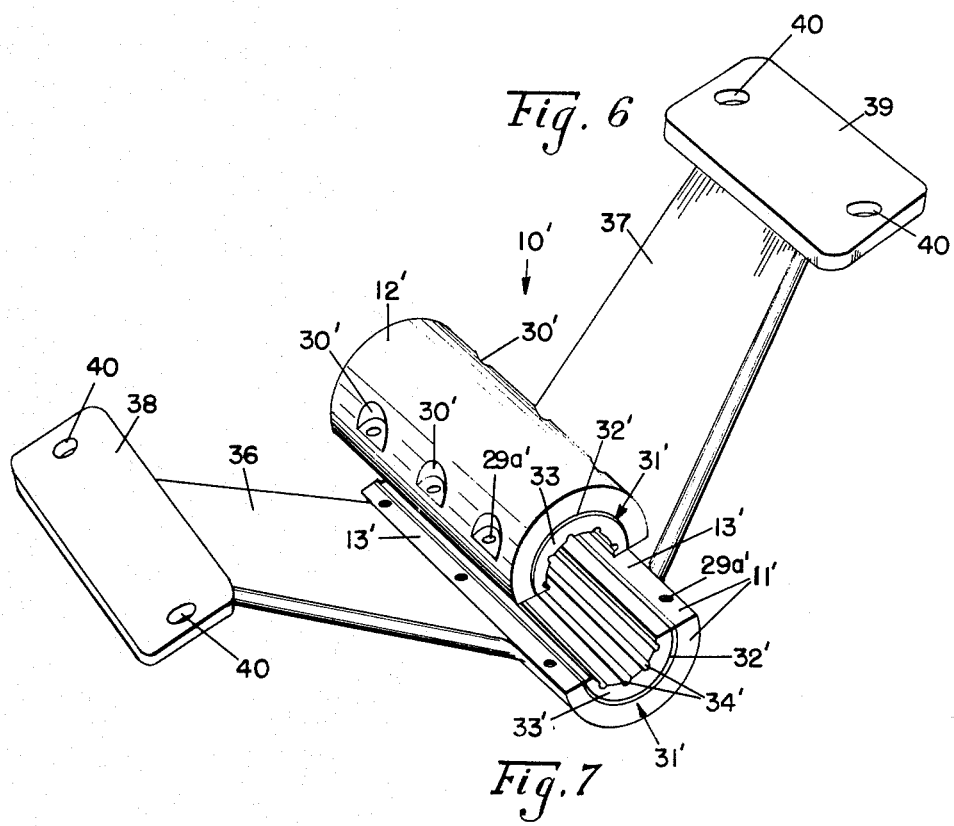
INVENTOR.
JAMES GLENN SATTERTHWAITE
BY
Felix A. Russell

United States Patent Office 3,236,570
Patented Feb. 22, 1966

3,236,570
DEMOUNTABLE STERN HOUSING FOR MARINE BEARINGS AND METHOD OF USING THE SAME
James Glenn Satterthwaite, 305 Sterling Point Drive, Portsmouth, Va.
Filed Dec. 26, 1962, Ser. No. 246,964
5 Claims. (Cl. 308—15)

This invention relates to a demountable housing for marine bearings and method of using the same, and it consists in the combinations, constructions and arrangements of parts herein described and claimed.

Generally there is provided a housing cast of bronze or other corrosion resistant alloys as two semielliptical pieces having mating semicylindrical recesses. The lower section or base is provided with flanges for permanent bolting to wooden boats or ships, or for welding to metallic vessels. The upper section or head is secured directly to the base by stud bolts of sufficient size and quantity, and removal thereof for bearing replacement is quickly and easily effected by removing said stud bolts. Alternatively the base can be supported on integral V struts having flanged ends for bolting or welding to the bottom of a vessel having multiple screws.

Rubber bearings of conventional types are used in conjunction with the demountable housing. The bearings are divided into semicylindrical segments along a plane coinciding with the longitudinal center line of the propeller shaft journaled therein.

Installation or removal and replacement of the bearing is simply accomplished by removal of the upper housing section or head from the lower section or base for access to the top half of the sleeve bearing. A slight jacking of the tail shaft from below (or chain pull from above) will relieve the weight load of the shaft and propeller from the lower bearing segment, thus facilitating its circumferential movement by a gentle driving action to the open space above the shaft. A replacement lower bearing segment may then be gently arcuately driven or pushed into the space between the shaft and the housing base. Next an upper bearing segment is laid over the top half of the shaft. Finally the upper housing section or head is placed over the upper bearing segment and is bolted to the lower housing section to complete the bearing installation or replacement, all without removal or any disturbance of the shaft, propeller or rudder of the vessel.

Marine rubber bearings, as used for the support of propeller shafting in large or small boats of single or multiple screw design, are secured and retained in proper position by one, or sometimes a combination, of three general arrangements which have become standards in marine practices in the United States, namely, (1) solid stern castings (for small vessels, single screw), (2) stern tube assembly (for large vessels, single screw) and (3) solid strut or V (for small or large vessels, multiple screw).

The solid casting of the first category consists of a solid, one piece casting (usually bronze for wooden vessels) which is secured to the stern post of the vessel by suitable bolting. This type installation is common in wooden hulls. The solid stern casting is bored to accommodate a sleeve type rubber bearing, with metal to metal or light press fit. Once the stern casting with bearing is secured to the stern post, the remaining underwater components, such as propeller, rudder assembly, etc., can be installed. Replacement of the rubber bearing when worn always requires complete dismantling of underwater components, including the stern casting, if the propeller shaft is to remain intact. The stern casting is then conveyed to a machine shop where the old sleeve is pressed out and a new one pressed in. The entire procedure must be reversed to place the stern casting with bearing back into working position. In some instances on small steel hulls, the stern casting (or tube) is an integral part of the keel. In this case, the propeller shaft must also be removed, for the old sleeve must be cut and destroyed in order to remove it. The new sleeve is then either jacked into the casting or a shrink fit is accomplished by freezing.

The stern tube assembly of the second category consists of a flanged rubber bearing carried in a metal housing within the ship's shaft log, and secured by external bolts around the periphery of the flange extending into the wall of the stern tube. Rubber bearings of both the solid (one piece) and split types are used in this arrangement. Where removal of the bearing becomes necessary for replacement, the underwater components, such as propeller, rudder assembly, etc., must first be dismantled, as in the case of the first category, using the solid stern casting. The bearing is then jacked or pulled from the stern tube and a new one replaced in a similar manner.

The solid strut of the third category involves vessels of medium and large classes, with the struts being of the V type construction for extra strength and two of the flanges for mounting or securing to the ship's bottom. In this category, where multiple screws are used, the propellers are swung on the outboard sides of the ship's keel, and the shaft bearings are housed in one or more solid struts secured directly to the ship's underside. Replacement of rubber bearings in struts always requires dismantling of the underwater components, including propeller, rudder assembly, and in addition the pulling of the propeller shafts, to permit access to the bearings. These are then either jacked or cut from the strut hubs, and new ones installed by similar methods, as in the previous two categories.

The foregoing three general constructions of marine rubber bearing housings are standard in marine practice, and in all three categories the heavy work and time required to accomplish the replacement of a bearing is extensive and costly. No other method or system exists today (nor has another ever existed) acceptable to safe shipyard practice, wherein the procedure for bearing replacement is confined to the immediate area of the bearing only, as herein described.

It is accordingly an object of the present invention to provide a demountable housing for marine bearings constructed and arranged to permit quick and easy removal and replacement of the bearing without removing or disturbing the shaft, propeller and/or rudder assembly.

It is another object of the invention to provide such a housing in which a lower section is permanently fixed to the vessel and an upper section is bolted to the fixed section for easy removal therefrom.

It is a further object of the invention to provide a device of the character described in which the bearing is longitudinally divided into two semicylindrical segments, the upper one being liftable from the shaft and the lower one being removable (or replaceable) by arcuate movement from (or to) its normal position into (or from) the free space above the shaft provided by removal of the upper housing section and bearing segment.

It is another object of the invention to provide a method for replacing bearings of the type herein disclosed without removing or disturbing the shaft, propeller, or rudder assemblage, which method includes the novel steps of slightly lifting the shaft to relieve pressure on the lower bearing segment and removing and replacing said lower segment by arcuate movement thereof around the shaft.

Figure 2:
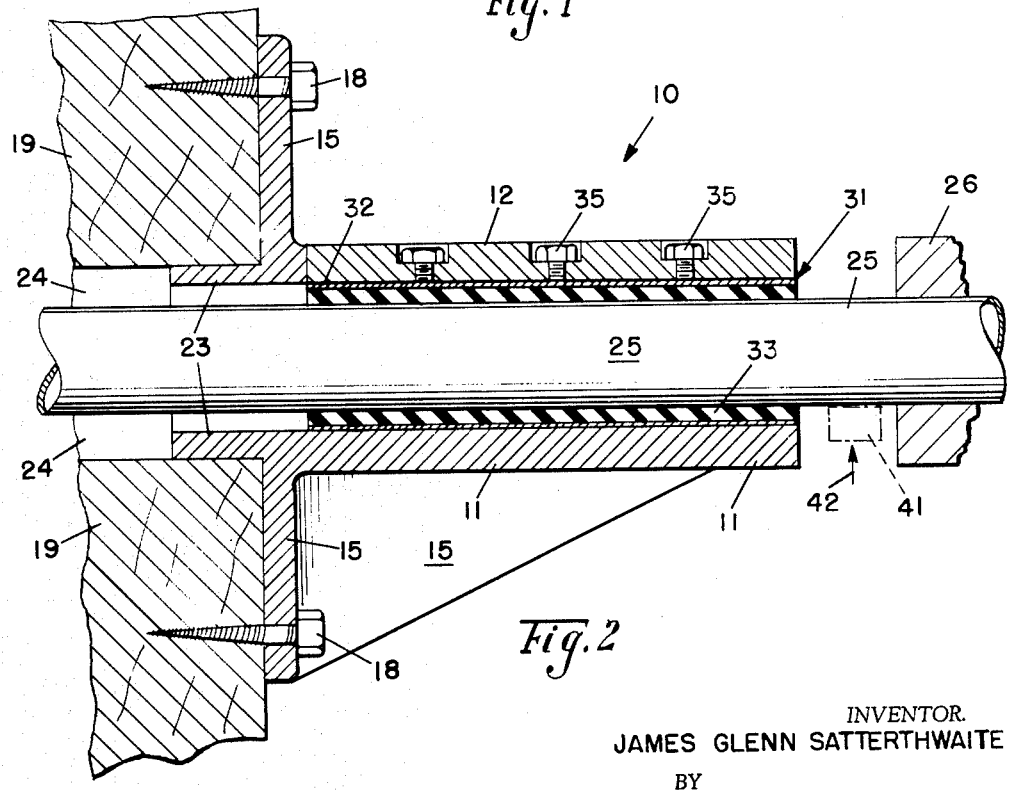

Other and further objects of the invention will become apparent from a reading of the following specification taken in conjunction with the drawings, in which:

FIGURE 1 is a side elevational view of a preferred embodiment of the invention,

FIGURE 2 is an enlarged fragmentary elevational view of the showing of FIGURE 1 in section taken on line 2—2 of FIGURE 3, FIGURE 3 is an end elevational view in section on line 3—3 of FIGURE 1, FIGURE 4 is a perspective view of the housing and bearing of FIGURE 2 with the upper housing section and the upper bearing segment removed, FIGURE 5 is an enlarged fragmentary view of the disclosure of FIGURE 3, showing the beginning of removal of the lower bearing segment, FIGURE 6 is a rear elevational view of a modified form of the invention, and FIGURE 7 is an enlarged exploded perspective view of one of the bearing assemblies of FIGURE 6.

With reference to FIGURES 1 through 5 of the drawings, the numeral 10 generally designates a demountable stern bearing assemblage constructed according to the present invention. The assemblage 10 comprises a lower bearing housing section 11 and an upper bearing housing section 12. The housing sections 11 and 12 are cast of marine bronze or other alloys resistant to corrosion by fresh and/or sea water, and are separately machined to present planar mating surfaces 13 and 14, respectively.

The lower housing or base section 11 is cast with an integral vertical flange 15 and with an integral triangular strengthening web 16 extending between the flange 15 and the lower medial face of the housing section 11, as shown.

The flange 15 provides an attachment plate, which is bored at 17 (FIGURE 4) to receive the shanks of lag bolts 18 by which the housing section 11 is fixed to a keel 19 of a vessel generally designated 20 (FIG. 1). The keel 19 has a lower rear extension 20a to provide a support for the lower bearing (not shown) of a rudder shaft 21 on which a conventional rudder blade 22 is fixedly mounted.

The housing section 11 also has an integral coaxial cylindrical forward extension 23 which fits snugly in a passageway 24 (FIG. 2) in the keel 19 through which a tubular drive shaft 25 passes. The drive shaft 25 has a propeller 26 fixed to its rear end in conventional manner.

The upper housing section 12 is slightly shorter than the lower housing section 11, the difference in length being compensated for by a semiannular integral portion 27 (FIG. 4) on the flange plate 15 against which portion the forward end of the housing section 12 abuts with a flush fit.

The housing sections are rigidly interconnected by a plurality of stud bolts 28 and cooperating nuts 29. The bolts 28 pass through aligned vertical bores 29a in the mating side edges of the elliptical upper and lower housing sections. The heads of the bolts 28 and the nuts 29 lie within countersunk pockets 30 formed in known manner.

The bearing parts proper of the assemblage comprise a pair of semicylindrical members 31. Each member 31 consists of a semicylindrical metallic shell 32 on the inner surface of which is molded, or to which is vulcanized, cemented or otherwise fixed, a semicylindrical thick lining 33 of bearing rubber or known composition. The lining 33 has a series of longitudinally extending grooves 34 molded in its inner surface to conduct water into the bearing to lubricate the same.

Either or both of the housing sections 11 and 12 may be provided with one or more radially disposed tapped bores to receive set screws 35 for anchoring the bearing members or segments 31 against movements relative to their seats in the housing sections 11 and 12. However, the shells 32 usually are sufficiently tightly clamped between the housing sections 11 and 12 to make the use of said set screws unnecessary. Here it should be noted that the rotatable movement for the installation and/or removal of the lower shell segment permits the moving (rotation) of the upper bearing member (which wears away much less rapidly) into the lower position when the worn lower segment is being replaced. And further economy may be effected by having the removed shells 32 relined, since they can be removed undamaged, according to the present invention.

In the modification of FIGURES 6 and 7, the basic structure is substantially identical to that of the species of FIGURES 1 through 5. Accordingly, the parts of the disclosure of FIGURES 6 and 7 corresponding to like parts in the first described species are designated by the same numerals, primed, as those applied unprimed in FIGURES 1 through 5.

The second species differs from the first in the provision of a pair of integral web arms 36 and 37 cast on the lower housing section 11' and for defining a V support for the housing. The free ends of the arms 36 and 37 have integral flat plates 38 and 39, respectively, for attachment to the hull of a twin propeller vessel 39, as by lag screws (not shown) passing through screw holes 40 in said plates. With metallic hulls (not shown) the plates 38 and 39 can be welded or bolted in desired positions.

The method of removing and replacing a worn or damaged bearing is best illustrated in FIGURES 2, 3 and 4. After removal of the stud bolts 28 the upper housing section 12 and the upper bearing segment 31 are lifted away, leaving an open space above the lower housing section 11, the lower bearing segment 31 and the shaft 25 cradled therein. Next the propeller shaft is raised very slightly (a sixty-fourth of an inch, more or less) to relieve the pressure on the lower bearing segment due to the weight of the propeller and its drive shaft. The lifting of the shaft 25 may be effected by a jack from below, or by a chain or cable pulled from above. Such devices are symbolically represented by a block 41 and a force arrow 42 (FIGURE 2), the block 41 easily fitting into the space between the rear end of the housing 10 and the forward face of the hub of the propeller 26. (This space is conventionally roughly equal to the diameter of the drive shaft.

Next the lower bearing segment is pushed or gently driven arcuately in the direction of the arrow 43 (FIGURE 5) until it reaches the position of the previously removed upper bearing segment, at which point it too can be lifted away. A replacement bearing segment is then laid over the shaft 25 and is pushed or driven gently into the space between the slightly lifted shaft 25 and the housing section 11. Finally an upper bearing segment and the upper housing section 12 are laid over the top of the shaft (with or without the using of spacing shims, if and as needed) and the parts are rejoined in working positions by replacing the bolts 28 and nuts 29.

While but two embodiments of the invention have been shown and described herein, it will be readily apparent to those skilled in the art that many minor modifications may be made without departing from the spirit of the invention or the scope of the appended claims.

What is claimed is:

1. A marine bearing assembly adapted to be mounted at the stern of a marine vessel in surrounding relationship to the vessel's propeller shaft, comprising: a lower bearing housing member having an upwardly open substantially semicylindrical seat formed therein; means for rigidly attaching said lower bearing housing member to the stern of said vessel in a position wherein at least said seat coaxially underlies a propeller shaft thereof; a lower bearing member having concentric inner and outer cylindrically curved surfaces, snugly interposed between said seat and said shaft with said outer surface disposed within said seat and said inner surface surrounding the undersurface of said shaft; an upper bearing housing member having a downwardly open substantially semicylindrical channel extending longitudinally thereof; means for quickly and easily detachably connecting said upper bearing housing member to said lower bearing housing member; an upper bearing member having concentric inner and outer cylindrically curved surfaces with said outer surface disposed within said channel and said inner surface surrounding the upper surface of said shaft; a rubber lining adhered to the inner surfaces of said upper and lower bearing members to snugly embrace and bear upon said shaft when said housing members are connected; said lower bearing member being insertable and removable by arcuate movements thereof into and from the seat in said lower bearing housing member when said housing members are disconnected and when said shaft is raised slightly to prevent or relieve immobilizing weight pressure on said lower bearing member during such movements, whereby said bearing members can be installed or can be removed and replaced without removing or appreciably disturbing the shaft, propeller and/or lower bearing housing of the vessel.

2. A marine bearing assembly as defined in claim 1 wherein said means for attaching said lower bearing housing member to the stern of said vessel includes a vertically disposed integral flange plate adjacent the forward end of said lower bearing housing member, said flange plate including an integral cylindrical forward extension which surrounds said shaft and projects at least partially into said stern.

3. A marine bearing assembly as defined in claim 2 additionally comprising an integral vertically and longitudinally disposed web extending between the lower surface of said lower bearing housing member and said flange plate for strengthening and rigidifying said structure.

4. A marine bearing assembly as defined in claim 1 wherein said means for attaching said lower bearing housing member to the stern of said vessel includes a pair of upwardly and laterally diverging arms integrally formed on said lower bearing housing member and constituting a V support therefor.

5. A marine bearing assembly as defined in claim 1 wherein said rubber linings have spaced longitudinally extending grooves in their bearing surfaces to conduct lubricating water into the bearings.

References Cited by the Examiner
UNITED STATES PATENTS

| | | | |
|---|---|---|---|
| 472,729 | 4/1892 | Hasford | 308—72 |
| 1,325,553 | 12/1919 | Bacon | 308—74 |
| 1,549,564 | 8/1925 | Slocum | 308—27 |
| 1,819,394 | 8/1935 | Tark | 308—74 |
| 2,524,948 | 10/1950 | Whitney | 308—34 X |
| 2,793,087 | 5/1957 | Hayes | 308—26 |
| 2,840,425 | 6/1958 | Howell | 308—27 |

DON A. WAITE, *Primary Examiner.*

ROBERT C. RIORDON, *Examiner.*

UNITED STATES PATENT OFFICE

Certificate

Patent No. 3,236,570  Patented February 22, 1966

James Glenn Satterthwaite

Application having been made jointly by James Glenn Satterthwaite, the inventor named in the patent above identified; and James B. Macy, Jr., of Morehead City, North Carolina, for the issuance of a certificate under the provisions of Title 35, Section 256 of the United States Code, adding the name of the said James B. Macy, Jr. to the patent as a joint inventor, and a showing and proof of facts satisfying the requirements of the said section having been submitted, it is this 7th day of June 1966, certified that the name of the said James B. Macy, Jr. is hereby added to the said patent as a joint inventor with the said James Glenn Satterthwaite.

[SEAL]

EDWIN L. REYNOLDS,
*First Assistant Commissioner of Patents.*